UNITED STATES PATENT OFFICE.

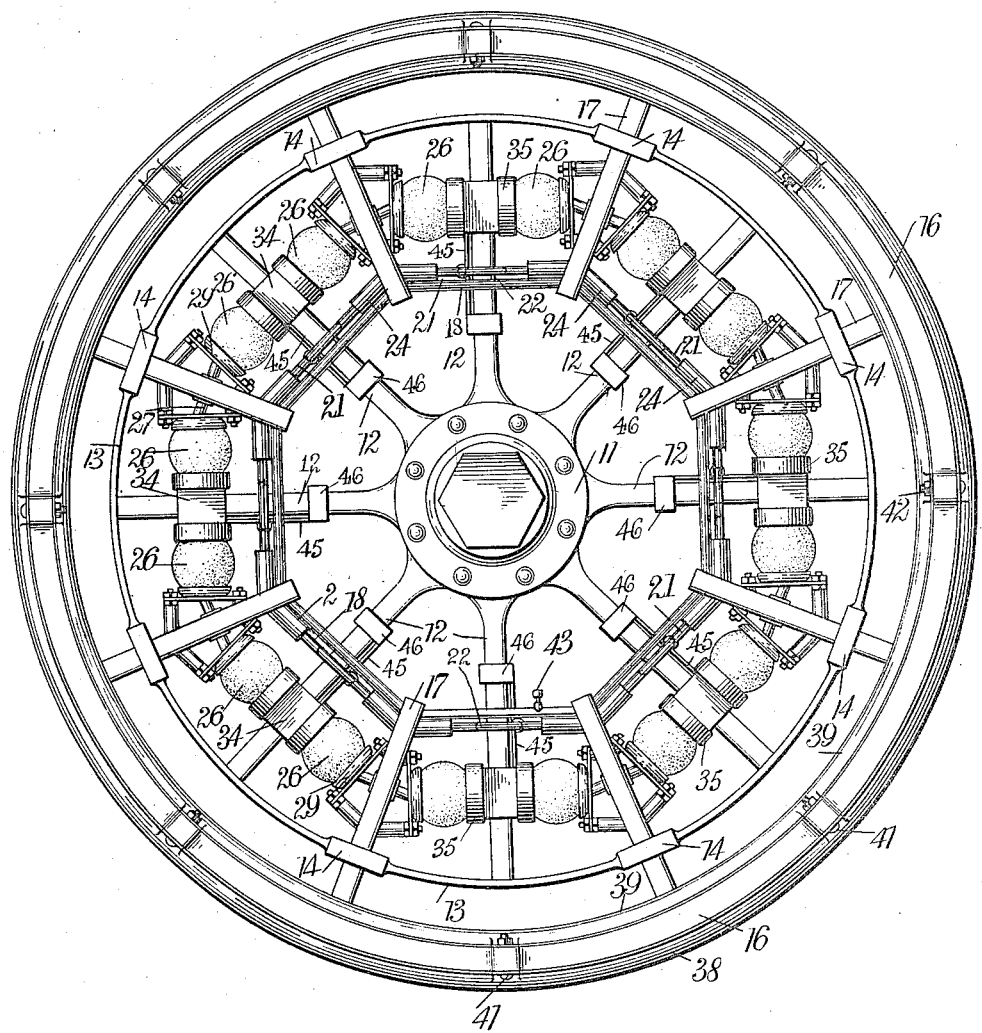
FIG. I.

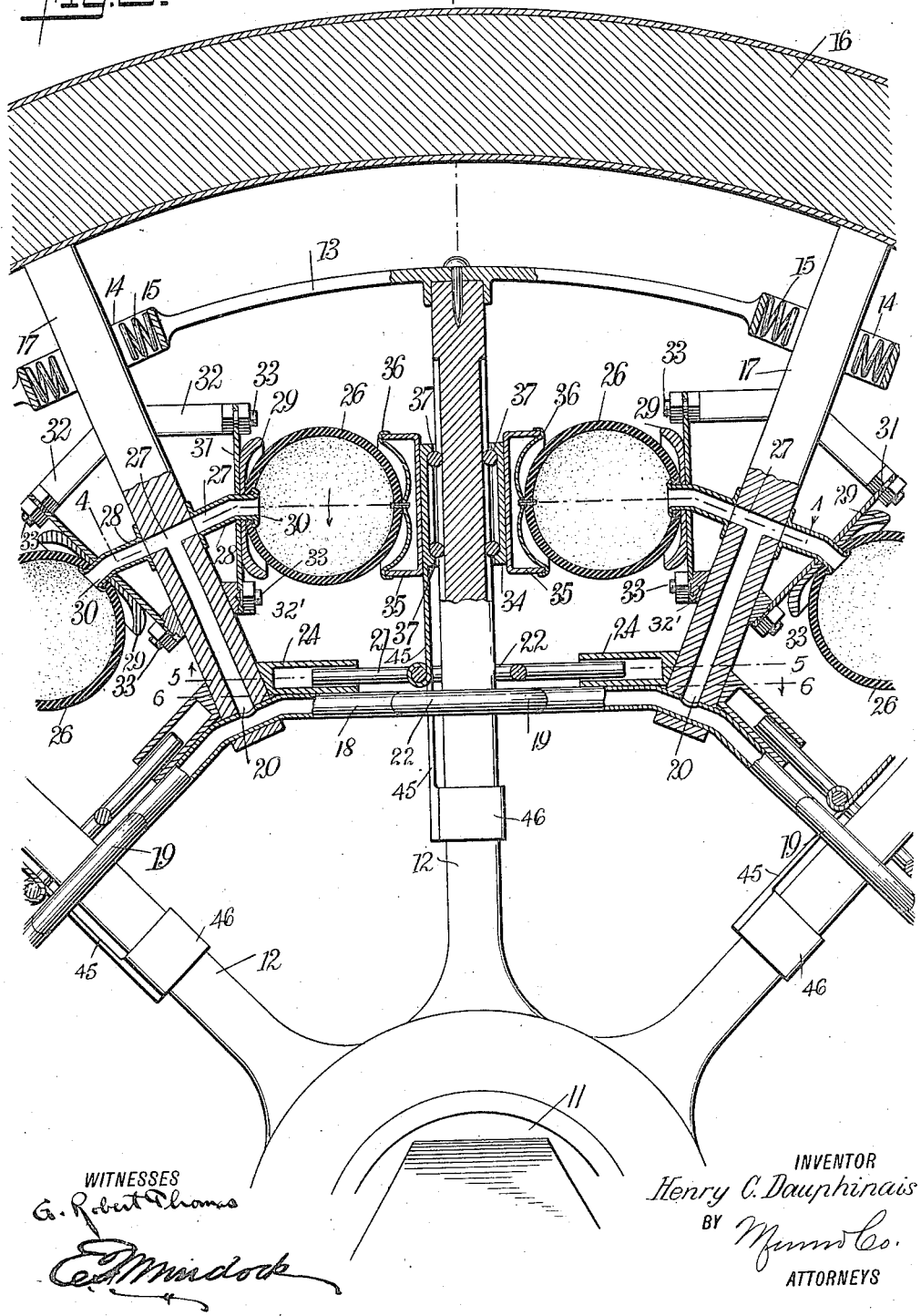

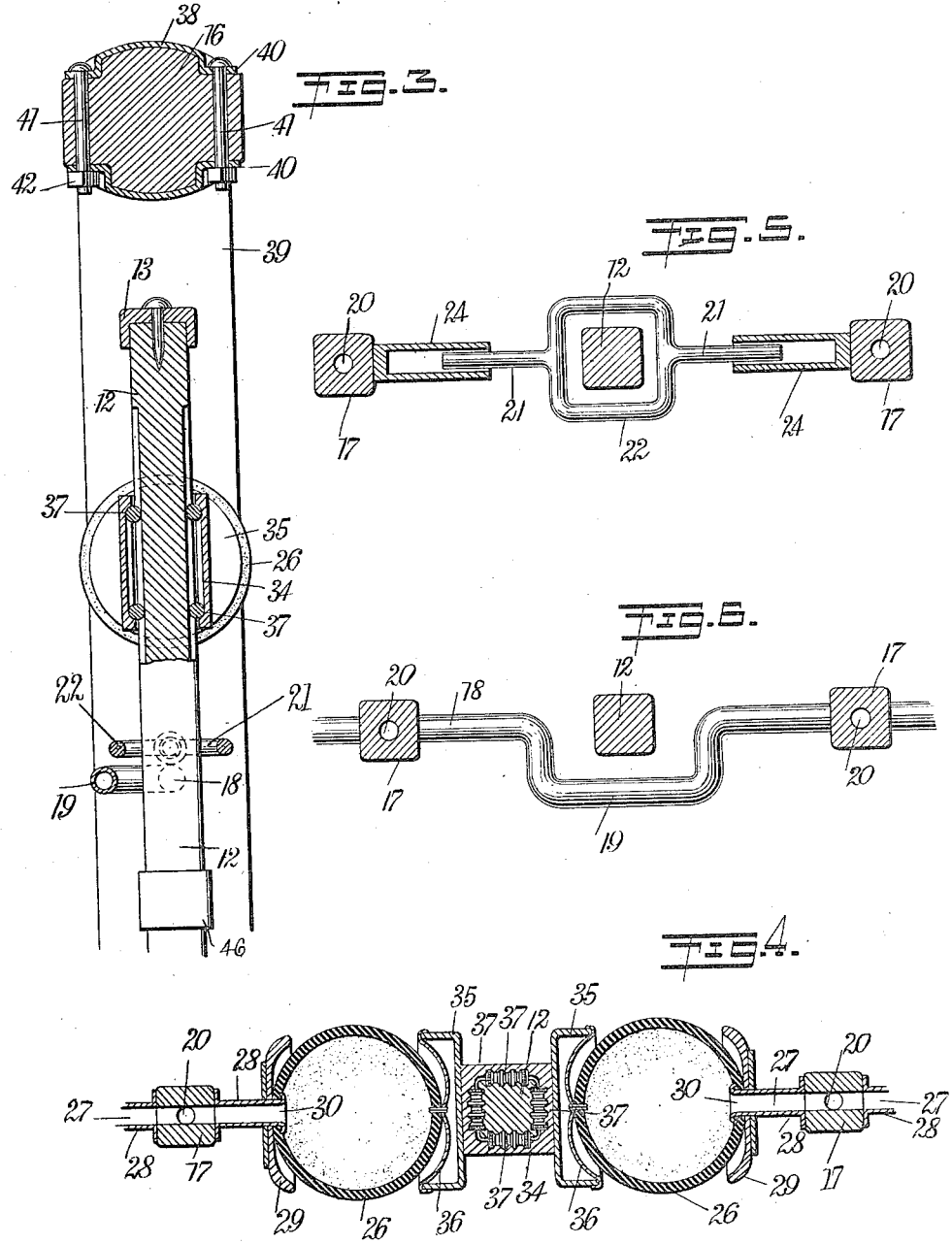

HENRY CLEMENT DAUPHINAIS, OF FARGO, NORTH DAKOTA.

VEHICLE-WHEEL.

1,215,124.
Specification of Letters Patent.
Patented Feb. 6, 1917.

Application filed April 16, 1913, Serial No. 761,487. Renewed July 18, 1916. Serial No. 110,007.

*To all whom it may concern:*

Be it known that I, HENRY C. DAUPHINAIS, a citizen of the United States, and a resident of Fargo, in the county of Cass and State of North Dakota, have invented a new and Improved Vehicle-Wheel, of which the following is a full, clear, and exact description.

Among the principal objects which the present invention has in view are: to provide a wheel the frame whereof is resilient to form a yielding structure intermediate the tread of the wheel and the hub thereof; to form a wheel divided in its structure to form distinct portions mutually supported by resilient members adapted to receive the load strain of the vehicle; to provide a system of pneumatic cushions interposed between separated wheel sections to carry the load strain of the vehicle, the pneumatic members being intercommunicating; and to provide suitable buffers between the separated portions of the wheel to form aids to the resilient members to carry an overload on said resilient members.

With these objects in view the invention consists in constructing a vehicle wheel in two sections, an outer or perimeter and an inner or hub section. Each of these sections is provided with a series of radially disposed and interspaced spokes, each series of said spokes being rigidly connected by ring-like members having formed therein guides for the opposite series of spokes.

It further consists in providing a system of interconnected pneumatic cushion members disposed between the opposite members of the opposite series of spokes.

It further consists in disposing within the guide portions of the said connecting members resilient buffers.

One embodiment of the present invention is disclosed in the structure illustrated in the accompanying drawings, in which like characters of reference denote corresponding parts in all the views, and in which—

Figure 1 is a side view of a wheel constructed and arranged in accordance with the present invention;

Fig. 2 is an enlarged detail view, in vertical longitudinal section, showing a fragment of a wheel constructed and arranged in accordance with the present invention;

Fig. 3 is a vertical cross section taken on the line 3—3 in Fig. 2;

Fig. 4 is a cross section taken on the line 4—4 in Fig. 2;

Fig. 5 is a sectional view taken on the line 5—5 in Fig. 2; and

Fig. 6 is a sectional view taken on the line 6—6 in Fig. 2.

A distinctive feature of the present invention as illustrated in the accompanying drawings consists in the separation of the framework of the wheel in two distinct portions, which, for the convenience of description will hereinafter be termed the inner wheel and the outer wheel. Both wheels are, in themselves, rigid. The resiliency of the completed vehicle wheel resides in the members interposed between the members of the said inner wheel and outer wheel. The inner wheel is provided with a hub 11 of any suitable and approved construction. Rigidly mounted upon the hub 11 are the spokes 12. Any number of spokes 12 may be employed. The spokes are spaced apart substantially as shown in the drawings to extend between the corresponding spokes of the outer wheel. The outer extremities of the spokes 12 are rigidly connected by the ring 13. The ring 13 is provided at suitable intervals with loops 14 through which are extended the spokes of the outer wheel. The loops 14 are elongated to receive the spiral springs 15, which springs 15 are normally separated from the spokes of the outer wheel, but are juxtaposed thereto to engage the same whenever the said spokes of the outer wheel are moved lengthwise of the loops 14. In the transverse dimension of the loops 14 they fit snugly and form guides for the control of the said spokes of the outer wheel.

The outer wheel primarily consists of the rim 16 from which at intervals are inwardly extended the spokes 17. It is the spokes 17 to which reference is above made as being extended through and guided by the loops 14. At the extreme inner end of the spokes 17 the said spokes are rigidly united by a connecting tube 18. The tube 18, as shown in the drawings, extends between each of the spokes 17, and is provided with the offset portions 19, offset to avoid the independent swing or movement of the spokes 12. The tube 18 is provided with an opening which communicates with the passage 20 formed adjacent the inner end of each of the spokes 17, and for the purpose hereinafter described. It is through the tube 18 and the valve 43, that air is pumped into the globes 26.

To guide the spokes 12 relative to the spokes 17 a connecting rod 21 is employed. Each of the said rods is provided with an elongated loop 22. Each end of the rods 21 is guided in a cylinder 24. Each rod 21 is pivotally connected with and supports the collars 34, by the rod 45, at the opposite end of which is the guide collar 46.

A vehicle wheel, when constructed in accordance with the present invention, provides for supporting the load strain on the spokes 12 which are horizontally extended from the axle held within the hub 11. To maintain the relative disposition of the spokes 12 and 17 there is provided a series of hollow rubber globes 26. The globes 26 are distributed in paired relation. Each pair is pneumatically connected by a passage 27 formed by the tubes 28 and a bore through the spokes 17. The tubes 28 are securely bolted to the spokes 17 and are extended through a central perforation in the cups 29 and through perforations in the globes 26. The ends of the tubes 28 are overturned to form curled sections 30, under the overturned edges whereof the globes 26 are held. Each cup 29 is supported on a plate 31. Each plate 31 is rigidly secured to a spoke 17 by means of arms 32 and 32' and by studs 33.

Slidably mounted on each of the spokes 12 is a collar 34. Bolted to the side of each collar 34 adjacent the globe 26 is a metal cup 35. Across the openings of the cups 35 is extended a canvas or other fabric cover 36. If desired, a similar canvas may be stitched over the cups 29. The globes 26 are secured to the center of the covers 36 to maintain the alinement thereof. The covers 36 serve to form the non-abrasive surface for the reception of the globes when the same are compressed during the operation of the vehicle wheels.

To avoid friction or torsional strain upon the globes 26 the collars 34 are provided with bearing rollers 37. The rollers 37, as seen best in Fig. 4 of the drawings, are arranged on the four sides of the collars to avoid any pinching or jamming strain of the collar on the spoke 12 during the operation of the wheel or the pressure of the globes 26 thereupon.

The rim 16 may be constructed of any suitable material such as wood, composition rubber or cork. In the preferred construction it is held between the clamping plates 38 which constitute the tire cover or shoe and the inner rim 39 of the outer wheel. At intervals the plates 38 and rim 39 are stamped to form bolting recesses 40 and to receive the heads of the bolts 41 and the nuts 42 provided therefor. It will be understood that any usual and approved design of the plate 38 may be employed. The plate may be perforated to permit the protrusion of the rim 16 whereby the frictional engagement of the material of the rim 16 would be added to the wearing virtue of the plate 38.

By means of the arrangement of the globes 26 and the connection of each pair thereof with the passages 20 formed in each of the spokes 17 and of the passage of the air tube 18, a universal distribution of the air contained in the pneumatic system is insured; and by the use of the valve 43, the whole pneumatic system may be replenished. In this manner each of the globes 26 is compelled to contribute to the resistance of the load strain, which, as above stated, is exerted primarily on those globes 26, which at any moment are underneath the spokes 12 which at that moment are in the horizontal position. Secondarily the globes 26 which are beneath the spokes 12 next adjacent the horizontal spokes 12 are compressed under the load strain, and so, diminishing gradually toward the globes beside the spoke 12 which is at the moment vertically disposed in the vehicle wheel. As the globes 26 are compressed on the lower half of the vehicle wheel the air is transferred through the tube 18 for distribution equally to the globes not under compression, or of lesser compression. It will be understood that the load strain is carried in each instance by the globe 26 which is beneath one of the spokes 12.

Having thus described my invention, what I claim as new and desire to secure by Letters Patent is:—

1. A vehicle wheel, having a hub section and a rim section, said sections being structurally separated; a series of spokes mounted rigidly on said hub section to radiate therefrom, the diametric spread of said spokes being less than the inner diameter of said rim section; a second series of spokes mounted rigidly on said rim section to converge therefrom in line with the center thereof; a plurality of resilient members disposed between the sides of the spokes of said series, to support the weight of said sections laterally on said spokes; and a plurality of rings, each rigidly connecting the ends of one of said series of spokes, to support the same.

2. A vehicle wheel, having a hub section and a rim section, said sections being structurally separated; a series of spokes mounted rigidly on said hub section to radiate therefrom, the diametric spread of said spokes being less than the inner diameter of said rim section; a second series of spokes mounted rigidly on said rim section to converge therefrom in line with the center thereof; a plurality of resilient members disposed between the sides of the spokes of said series, to support the weight of said sections laterally on said spokes; means operatively connecting said resilient members throughout said wheel to transfer and equalize the pressure therein; and a plurality of rings, each rigidly connecting the ends of one of said series of spokes, to support the same.

In testimony whereof I have signed my name to this specification in the presence of two subscribing witnesses.

HENRY CLEMENT DAUPHINAIS.

Witnesses:
H. AMERLAND,
L. A. JACOBSON.

Copies of this patent may be obtained for five cents each, by addressing the "Commissioner of Patents, Washington, D. C."